Patented July 14, 1936

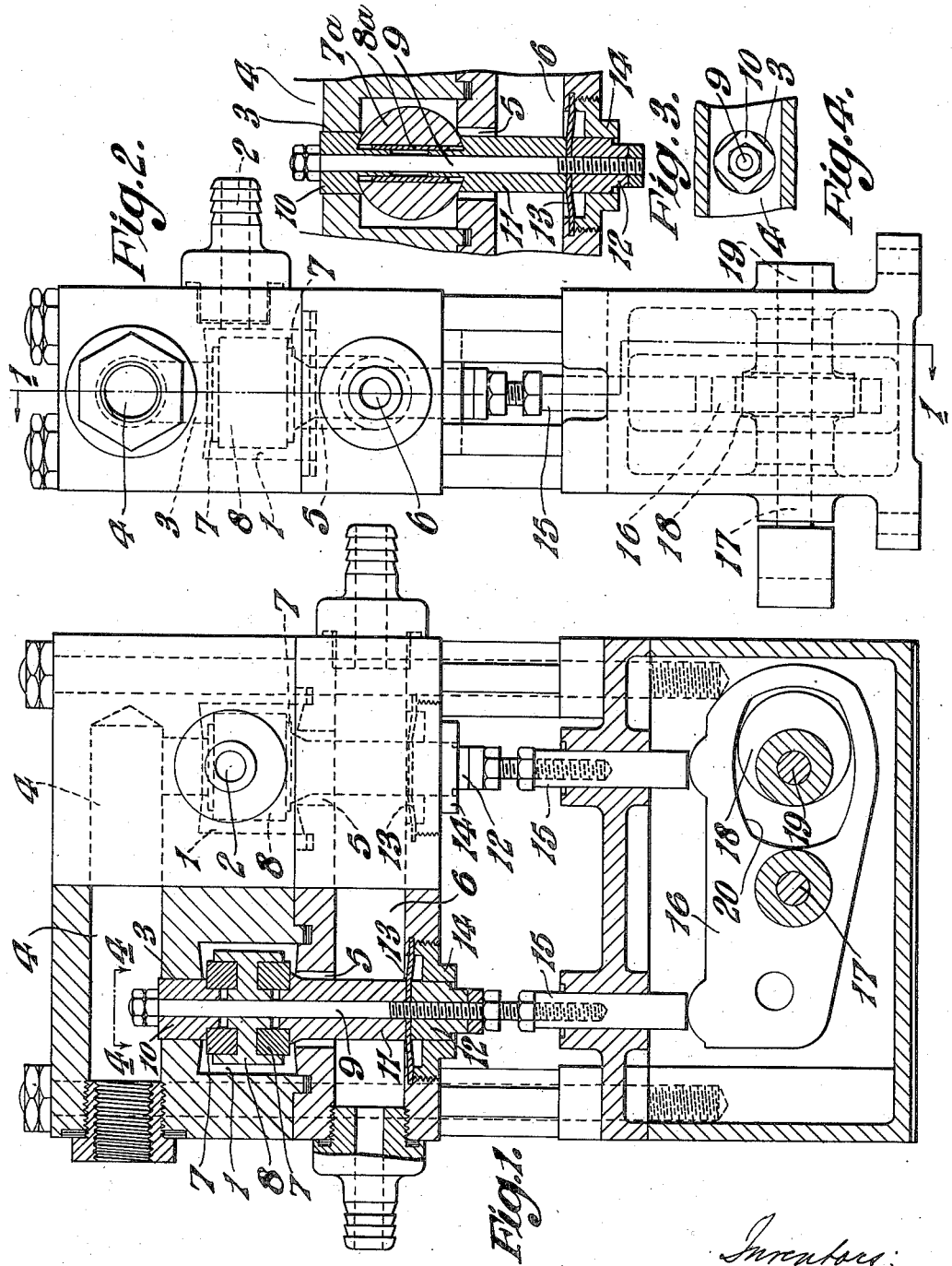

2,047,319

UNITED STATES PATENT OFFICE 2,047,319

CONTROL VALVE FOR LIQUID ELEVATING APPARATUS

William Herbert Exley, Market Harborough, and Walter Haddon, Forest Hill, London, England Application May 17, 1933, Serial No. 671,578
In Great Britain May 19, 1932

5 Claims. (Cl. 277—20)

This invention relates to control valves for liquid elevating apparatus of the type comprising a pair of containers having inlet and outlet openings for the liquid, and valve means for connecting each container in turn to a source of gas under pressure so as to discharge the liquid contents of that container, and at the same time connecting the other container to atmosphere or other low pressure region so as to allow that container to refill with liquid. Apparatus of this type is particularly suitable for elevating acids and other corrosive liquids.

A control valve in accordance with the present invention comprises two valve chambers, each in constant communication with one of the pumping containers and each having at one end an inlet port connected to the source of gas under pressure and at the other end an outlet port connected to the low pressure region, a valve member in each of the valve chambers which is movable between and is adapted to seal alternatively the inlet and outlet ports of that chamber and means for reciprocating the valve members in opposite phase.

The invention is illustrated in the accompanying drawing in which Figure 1 is a vertical section through one form of control valve taken on the line 1—1 of Figure 2 which is an end elevation of the valve; Figure 3 is a fragmentary section similar to that of Figure 1 through a valve having a modified form of valve member and Figure 4 is a detail view taken along the line 4—4 of Figure 1.

Referring first to Figures 1, 2 and 4 of the drawing, the control valve shown comprises two valve chambers 1 which are each in constant communication through a port 2 formed in the side wall of the chamber with one of the pumping containers. The valve chambers communicate through inlet ports 3 at their upper ends with a common channel 4 which is connected to a source of gas under pressure and through outlet ports 5 at their lower ends with a common channel 6 which is connected to atmosphere or other low pressure region.

Slidably mounted in each valve chamber is a valve member consisting of a pair of annular rubber discs 7 fitted into the upper and lower faces of a block 8 through which passes centrally a rod 9. The upper end of this rod is surrounded by a sleeve 10 which passes through and is guided by the inlet port 3, the sleeve being formed with flats (see Figure 4) so as not to close the port. The lower end of the rod 9 is surrounded by a sleeve 11, which passes through the outlet ports and across the channel 6, and by a cylindrical nut 12 having flats at its lower end, which is threaded onto the rod 9. Between the sleeve 11 and nut 12 is gripped a rubber diaphragm 13 whose periphery is secured in a recess in the lower wall of the channel 6 by an externally threaded nut 14 having flats at its lower end, which also forms a guide for the nut 12 on the spindle 9. Securing nuts are threaded onto each end of the spindle. Apart from these securing nuts and the spindle 9 which are of acid resisting metal and the discs 7 and diaphragm 13 which are of rubber, all the parts are formed of ebonite, so that the valve can be used in apparatus for pumping such liquids as fuming hydrochloric acid.

The valve assembly mounted on the spindle 9 can move as a whole in a vertical direction so as either to bring the upper of the discs 7 against the mouth of the inlet port 3 and connect the pumping container port 2 to the exhaust port 5 or to bring the lower of the discs 7 against the mouth of the exhaust port 5 and connect the pumping container port 2 to the inlet port 3. The block 8 is located on the spindle by the sleeves 10 and 11, which bear only against the rubber discs 7, so that when the valve member is pressed against one of the ports it can slide along the spindle to a limited extent. The rubber diaphragm 13, which is sufficiently flexible not to hinder the movements of the valve assembly, prevents any moisture contained in the exhaust gas from the pumping container from leaking down into the operating mechanism now to be described.

The lower ends of the spindles 9 rest on the upper ends of vertically sliding plungers 15 which slide through openings in the top of the closed chamber containing the valve actuating mechanism and are provided with adjusting screws. The lower ends of these plungers rest on opposite ends of a lever 16 which is oscillated about a shaft 17 by a cam 18 mounted on a rotating shaft 19 and engaging in a suitably shaped cut-out 20 in the lever 16. The cam 18 and cut-out 20 are so shaped that during the greater part of each half revolution of the shaft 19 one end of the lever is fully raised, so that the corresponding valve member is raised to close its inlet port, and the other end of the lever is fully lowered so that the corresponding valve member falls by its own weight assisted by the gas pressure to close its exhaust port. During the change over from one position to the other the lever 16 is free (as shown in the drawing) to move to a limited extent independently of the cam; this permits the down-ward movement of one valve member to assist in raising the other and increases the speed of the change over.

The parts are so shaped and dimensioned that the area of the valve member in the raised position that is exposed to the gas pressure is less than the area of the valve member in the lowered position that is exposed to the pressure of the low pressure region. This is effected in the construction shown by undercutting the faces of the inlet and exhaust ports 3 and 6, so as to ensure that only that portion of the surface of the valve member that actually covers the port opening is exposed to the pressure within the port, and by making the exhaust port of greater diameter than the inlet port. The gas pressure thus tends to maintain the valves in position. At the change over the rotating cam has only to overcome the initial difference in the forces acting on the two valve members so that even at comparatively high gas pressures very little power is required to operate the valve.

Figure 3 shows an alternative form of valve member suitable for use in smaller control valves working at lower pressures. The valve member is here formed by a rubber ball 7a mounted on a sleeve 8a which is shorter than the diameter of the ball so that the sleeves 10 and 11 bear only against the rubber ball and allow it to slide along the spindle 9 to a limited extent when it is pressed against one of the ports. The shape of the valve member makes it unnecessary to undercut the faces of the ports.

What we claim and desire to secure by Letters Patent is:—

1. Control valve mechanism comprising an enclosing valve casing, a high pressure channel in said casing adapted to be connected to a source of elastic fluid pressure, a low pressure channel within said casing open to a low pressure region, a pair of valve chambers located between said channels and each having an inlet port leading into said high pressure channel and an exhaust port leading into said low pressure channel, reciprocating valves controlling said ports, each of said valves comprising a valve block, elastic members mounted on said block and projecting beyond the ends thereof, a valve actuating rod passing through the block from end to end and slidable therein, sleeves slidable on said rod on both sides of the valve, said sleeves contacting with the elastic members of the valve, the inner ends of said sleeves being spaced from the valve block whereby the valve body is rendered capable of limited movement along the rod in both directions, said casing having guide holes leading from the lower wall of the low pressure channel, the valve actuating rods being connected to said valves at their upper ends, said rods passing through the guide holes in the lower wall of the low pressure channel, rubber diaphragms surrounding said operating rods for preventing leakage from said low pressure channel, a second casing beneath the valve chambers, cam operated rocker mechanism located in the casing beneath said valve chambers, and valve operating plungers adjustably connected to the valve actuating rods, said second casing having holes wherethrough said plungers pass in sliding fit, the valve operating mechanism including a rocker arm, said plungers cooperating at their lower ends with said rocker arm of the valve actuating mechanism.

2. Control valve mechanism comprising an enclosing valve casing, a high pressure channel in said casing adapted to be connected to a source of elastic fluid pressure, a low pressure channel within said casing open to a low pressure region, a pair of valve chambers located between said channels and each having an inlet port leading into said high pressure channel and an exhaust port leading into said low pressure channel, reciprocating valves controlling said ports, each of said valves comprising a valve block, elastic members mounted on said block and projecting beyond the ends thereof, a valve actuating rod passing through the block from end to end and slidable therein, sleeves slidable on said rod on both sides of the valve, said sleeves contacting with the elastic members of the valve, the inner ends of said sleeves being spaced from the valve block whereby the valve body is rendered capable of limited movement along the rod in both directions, the valve actuating rods being connected to said valves at their upper ends, said rods passing diametrically across the low pressure channel and through the wall thereof, rubber diaphragms surrounding said rods for preventing leakage from said low pressure channel, a second casing below said valve chambers, cam operated rocker arm mechanism located in the casing beneath said valve chambers, and valve operating plungers adjustably connected to the valve actuating rods, said second casing having holes through which the actuating rods pass in sliding fit, said plungers cooperating at their lower ends with the rocker arm of the valve actuating mechanism.

3. Control valve mechanism comprising an enclosing valve casing, a high pressure channel in said casing adapted to be connected to a source of elastic fluid pressure, a low pressure channel within said casing open to a low pressure region, a pair of valve chambers located between said channels and each having an inlet port leading into said high pressure channel and an exhaust port leading into said low pressure channel, reciprocating valves controlling said ports, the area of the valves exposed to the elastic fluid pressure being less than the area exposed to the pressure in the low pressure region, each of said valves comprising a valve block, elastic members mounted on said block and projecting beyond the ends thereof, a valve actuating rod passing through the block from end to end and slidable therein, sleeves slidable on said rod on both sides of the valve, said sleeves contacting with the elastic members of the valve, the inner ends of said sleeves being spaced from the valve block whereby the valve body is rendered capable of limited movement along the rod in both directions, the valve actuating rods being connected to said valves at their upper ends, said casing having guide holes leading from the lower wall of the low pressure channel, said rods passing through said guide holes, rubber diaphragms surrounding said rods for preventing leakage from said low pressure channel, a second casing below the valve chambers, rocker mechanism located in the casing beneath said valve chambers and including a rocker arm, a cam for operating said rocker arm so shaped that during the greater part of each half revolution one end of the rocker arm is fully raised and the other end of the arm is fully lowered so that the corresponding valve member falls by its own weight assisted by gas pressure to close its exhaust port, and valve operating plungers adjustably connected to the valve actuating rods, said second casing having holes through which said rods pass in sliding fit, said plungers cooperating at their lower ends with the rocker arm of the valve actuating mechanism.

4. Control valve mechanism comprising an enclosing valve casing, a high pressure channel in said casing adapted to be connected to a source of elastic fluid pressure, a low pressure channel within said casing open to a low pressure region, a pair of valve chambers located between said channels and each having an inlet port leading into said high pressure channel and an exhaust port leading into said low pressure channel, reciprocating valves controlling said ports, valve actuating rods connected to said valves at their upper ends, said casing having guide holes leading from the lower wall of the low pressure channel, said rods passing through said guide holes, rubber diaphragms surrounding said rods for preventing leakage from said low pressure channel, a second casing below said valve chambers, cam operated rocker mechanism including a rocker arm located in the casing beneath said valve chambers, valve operating plungers connected to the valve rods, said second casing having holes through which said last rods pass in sliding fit, said plungers cooperating at their lower ends with the rocker arm of the valve actuating mechanism, and means for adjusting the effective length of said valve actuating rods and their plungers, said adjusting means being accessibly located between the casing containing the valve chambers and the casing containing the valve actuating mechanism.

5. Control valve mechanism comprising an enclosing valve casing, a high pressure channel in said casing adapted to be connected to a source of elastic fluid pressure, a low pressure channel within said casing open to a low pressure region, a pair of valve chambers located between said channels and each having an inlet port leading into said high pressure channel and an exhaust port leading into said low pressure channel, reciprocating valves controlling said ports, valve actuating rods connected to said valves at their upper ends, said casing having guide holes leading from the lower wall of the low pressure channel, said rods passing through said guide holes, rubber diaphragms surrounding said rods for preventing leakage from said low pressure channel, a second casing below said first casing, cam operated rocker mechanism including a rocker arm located in the second casing, said cam operated rocker mechanism being such as to permit a limited movement of the rocker arm relative to its operating cam at the period of change from the one position to the other, and valve operating plungers adjustably connected to the valve actuating rods, said second casing having holes through which the plungers pass in sliding fit, said plungers cooperating at their lower ends with the rocker arms of the valve actuating mechanism.

WILLIAM HERBERT EXLEY.
WALTER HADDON.